(12) United States Patent
Onfray et al.

(10) Patent No.: US 10,471,556 B2
(45) Date of Patent: Nov. 12, 2019

(54) METHOD FOR PRODUCING A PROTECTIVE REINFORCEMENT FOR A BLADE (P) HAVING A CURVED LEADING EDGE OR TRAILING EDGE

(71) Applicant: SAFRAN AIRCRAFT ENGINES, Paris (FR)

(72) Inventors: Remi Philippe Guy Onfray, Moissy-Cramayel (FR); Maxime Briend, Moissy-Cramayel (FR); Didier Pelletier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 52 days.

(21) Appl. No.: 15/759,169

(22) PCT Filed: Sep. 8, 2016

(86) PCT No.: PCT/FR2016/052248
§ 371 (c)(1),
(2) Date: Mar. 9, 2018

(87) PCT Pub. No.: WO2017/042497
PCT Pub. Date: Mar. 16, 2017

(65) Prior Publication Data
US 2018/0257185 A1    Sep. 13, 2018

(30) Foreign Application Priority Data

Sep. 10, 2015 (FR) ..................... 15 58442

(51) Int. Cl.
*B23P 15/04*    (2006.01)
*B21D 53/78*    (2006.01)
(Continued)

(52) U.S. Cl.
CPC ............. *B23P 15/04* (2013.01); *B21D 53/78* (2013.01); *B23H 5/04* (2013.01); *B23K 26/0093* (2013.01);
(Continued)

(58) Field of Classification Search
CPC ................. B23P 15/04; B23K 26/0093; B23K 2101/001; B23H 5/04; F01D 5/147;
(Continued)

(56) References Cited

U.S. PATENT DOCUMENTS 4,712,980 A * 12/1987 Gely ....................... F01D 5/147
                                                    415/914
9,199,345 B2 * 12/2015 Flesch ................... B22F 3/1055
(Continued)

FOREIGN PATENT DOCUMENTS

FR    2954200 A1    6/2011
FR    2965498 A1    4/2012
(Continued)

OTHER PUBLICATIONS

Preliminary Research Report received for French Application No. 1558442, dated Jun. 27, 2016, 4 pages (1 page of French Translation Cover Sheet and 3 pages of original document).
(Continued)

*Primary Examiner* — Ryan J. Walters
(74) *Attorney, Agent, or Firm* — Womble Bond Dickinson (US) LLP

(57) ABSTRACT

The invention proposes a method for producing a protective reinforcement for the leading edge (BA) or trailing edge of a blade (P), the leading edge (BA) or trailing edge being curved, the method comprising steps of flattening (102) a hollow tube (1) so as to form at least one fold line (6) extending along the tube (1), opening (104) the flattened tube (1) by cutting the tube (1) along a cutting line (8)
(Continued)

opposite the fold line (6) with respect to the tube (1), so as to form two flanks (16, 18) linked at the fold line (6) and intended to be mounted on the pressure side and the suction side of the blade (P), the method being characterised by a preliminary step (100) of bending the hollow tube (1) carried out before the flattening (102) and adapted such that the fold line (6) after flattening (102) is curved and substantially matches the curved leading edge (BA) of the blade (P).

12 Claims, 5 Drawing Sheets

(51) Int. Cl.
| | | |
|---|---|---|
| *F01D 5/28* | (2006.01) | |
| *F04D 29/28* | (2006.01) | |
| *F04D 29/32* | (2006.01) | |
| *B23H 5/04* | (2006.01) | |
| *B23K 26/00* | (2014.01) | |
| *F01D 5/14* | (2006.01) | |
| *B23K 101/00* | (2006.01) | |

(52) U.S. Cl.
CPC .............. *F01D 5/147* (2013.01); *F01D 5/28* (2013.01); *F04D 29/289* (2013.01); *F04D 29/324* (2013.01); *B23K 2101/001* (2018.08); *F05D 2220/32* (2013.01); *F05D 2230/20* (2013.01); *F05D 2240/303* (2013.01)

(58) Field of Classification Search
CPC ........ F01D 5/28; F04D 29/324; F04D 29/289; B21D 53/78; F05D 2220/32; F05D 2230/20; F05D 2240/303
See application file for complete search history.

(56) References Cited

U.S. PATENT DOCUMENTS

| | | | |
|---|---|---|---|
| 9,321,100 B2 * | 4/2016 | Dambrine | .............. B21D 53/78 |
| 2009/0044592 A1 * | 2/2009 | Shikano | ................ B21D 22/06 |
| | | | 72/382 |

FOREIGN PATENT DOCUMENTS

| | | |
|---|---|---|
| FR | 2972124 A1 | 9/2012 |
| FR | 2992887 A1 | 1/2014 |
| FR | 3012515 A1 | 5/2015 |

OTHER PUBLICATIONS

International Search Report and Written Opinion received for PCT Patent Application No. PCT/FR2016/052248, dated Nov. 17, 2016, 15 pages (7 pages of English Translation and 8 pages of Original Document).

International Preliminary Report on Patentability received for PCT Patent Application No. PCT/FR2016/052248, dated Mar. 22, 2018, 11 pages (6 pages of English Translation and 5 pages of Original Document).

* cited by examiner

METHOD FOR PRODUCING A PROTECTIVE REINFORCEMENT FOR A BLADE (P) HAVING A CURVED LEADING EDGE OR TRAILING EDGE

FIELD OF THE INVENTION

The present invention relates to a method for manufacturing a protective reinforcement for protecting the curved leading or trailing edge of a blade.

PRIOR ART

Certain blades, particularly blades included in portions of turbine engines such as straighteners or movable wheels, require the installation of a reinforcement to protect their leading edge against impacts and erosion, and/or protect their trailing edge.

Conventionally, a leading or trailing edge protective reinforcement has the shape of a foil with two flanks having a V- or U-shaped profile, the flanks being connected by a rectilinear leading edge. One of the flanks is applied to the pressure side of the blade, the other flank applied to the suction side of the blade, and the rectilinear leading end of the reinforcement is applied to the leading edge of the blade, which is also rectilinear.

The shape of the reinforcement is complementary to the blade to guarantee a solid attachment of the reinforcement to it, and so as not to modify the geometric characteristics of the blade.

The reinforcement is typically manufactured starting with a metal sheet, which is folded over itself so as to form a fold line defining its leading edge. Such manufacturing methods are described in documents FR2954200, FR2965498, FR2992887, FR3012515 or FR2972124.

Now the geometry of blades is evolving toward complex three-dimensional shapes, still having a relatively small thickness between their suction side and their pressure side (between 0.1 and 0.5 mm).

Such a blade P with a complex shape is illustrated in FIGS. 1 and 2.

The blade P has a leading edge BA which is not rectilinear; the rectilinear leading edge of a reinforcement R obtained by folding a metal sheet is therefore not complementary to the curved leading edge BA of the blade.

To ensure that the leading edge BA of the reinforcement actually fits the leading edge to which the reinforcement is to be applied, deforming the reinforcement R by cold stamping could be considered.

However, such cold stamping is likely to create corrugations and folds referenced D in FIG. 2, which are harmful to mechanical resistance and the aerodynamics of the reinforcement R.

DISCLOSURE OF THE INVENTION

One aim pursued by the invention is to avoid the formation of folds or corrugations on a protective reinforcement designed to protect a blade leading or trailing edge, during its manufacture or its assembly to the blade.

Now proposed is a method for manufacturing a protective reinforcement of the leading or trailing edge of a blade, the leading or trailing edge being curved, the method comprising steps of:
flattening of a hollow tube so as to form at least one fold line extending along the tube,
opening of the flattened tube by cutting the tube along a cut line opposite to the fold line with respect to the tube, so as to form two flanks connected to the fold line and designed to be applied to the pressure side and the suction side of the blade,
the method being characterized by a preliminary step of:
bending of the hollow tube carried out before flattening and adapted so that the fold line after flattening is curved and substantially complementary to the curved leading or trailing edge of the blade.

Bending allows a plastic deformation of the reinforcement to be accomplished before the stamping step, so that the leading or trailing edge of the reinforcement can be put into contact with the corresponding edge of the blade over its entire length. No additional deformation of the reinforcement likely to create corrugations or folds is then carried out when it is applied to the blade.

The invention can also be completed by the following optional features, taken alone or in any one of their technically possible combinations:
the bending is cold bending,
the flattening of the hollow tube forms on the tube two opposite fold lines, the cut line being one of the two fold lines,
the tube is made of metal,
the method further comprises a step of stamping the open tube so as to comply the flanks in a manner complementary to the pressure side and the suction side of the blade,
the open tube is stamped by means of a stamp into a groove formed in a die, the groove having a depth adapted so that at least one of the flanks of the tube has a free end portion projecting out of the groove when the fold line is in abutment against the bottom of the groove, the method further comprising cutting of the free end portion,
the open tube 1 is stamped by means of a stamp into a groove formed in a die, the groove having two opposite lateral openings and a length measured between the two lateral openings less than the length of the fold line of the open tube 1, the open tube 1 being positioned so that two free longitudinal end portions project out of the two lateral openings of the groove, the method further comprising cutting at least one of said free longitudinal end portions,
at least one cutting operation is a laser cutting,
at least one cutting operation is wire electrical discharge machining.

Also proposed is a method for manufacturing a reinforced blade having a curved leading edge, the method comprising steps of:
manufacture of a protective reinforcement by means of the preceding method,
attachment of the protective reinforcement to a blade, the fold line of the reinforcement being applied against the leading edge of the blade and the flanks.

DESCRIPTION OF THE FIGURES

Other features, aims and advantages of the invention will be revealed by the description that follows, which is purely illustrative and not limiting, and which must b read with reference to the appended drawings in which.

On all the figures, similar elements have identical references.

DETAILED DESCRIPTION OF THE INVENTION

Figure 1:
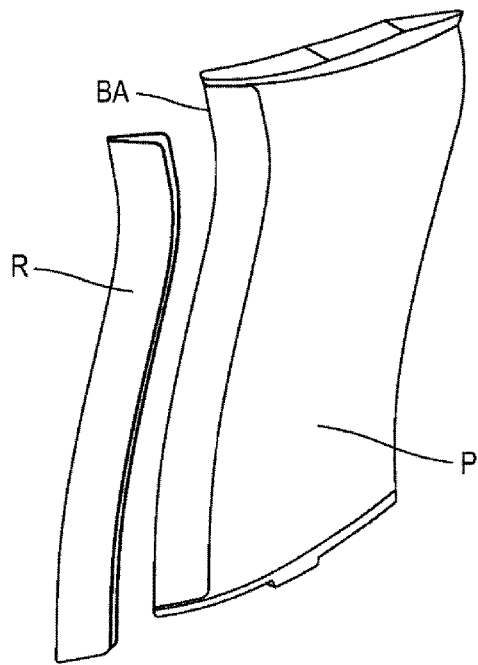
FIGS. 1 and 2, already discussed, are two lateral perspective views of a blade with a curved leading edge and of a protective reinforcement of the leading edge, before and after their assembly.
Figure 2:
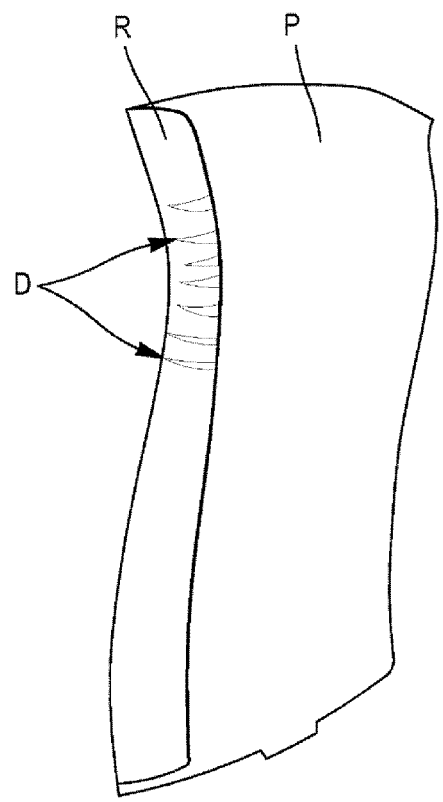
Figure 3:
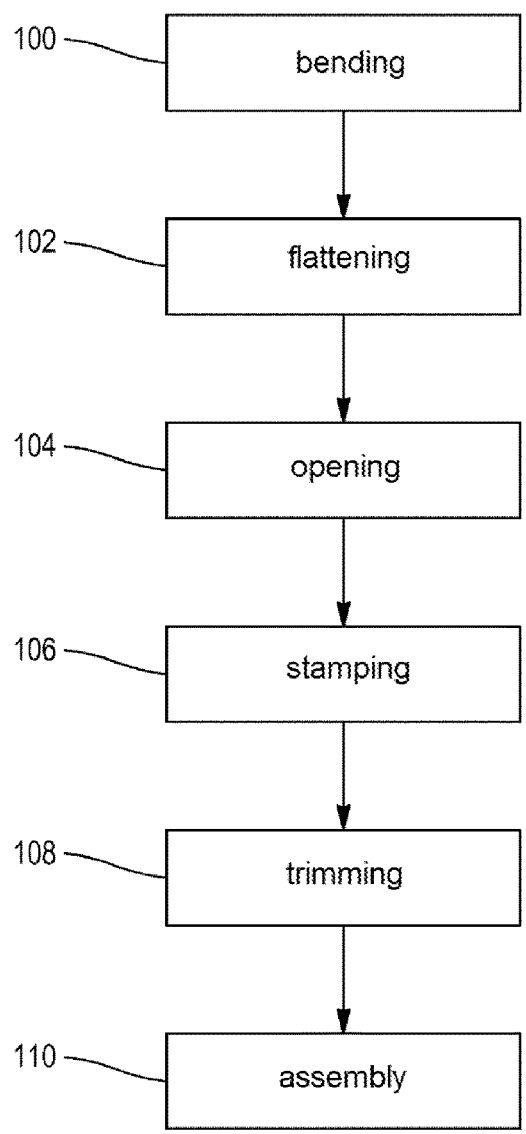
FIG. 3 is a flowchart of steps of a method for manufacturing a protective reinforcement of a leading edge, according to one embodiment of the invention.

The manufacture of a protective reinforcement to protect the leading edge BA of a blade P as shown in FIGS. 1 and 2, already discussed in the introduction, is implemented by means of steps in the flowchart of FIG. 3.

Figure 4:
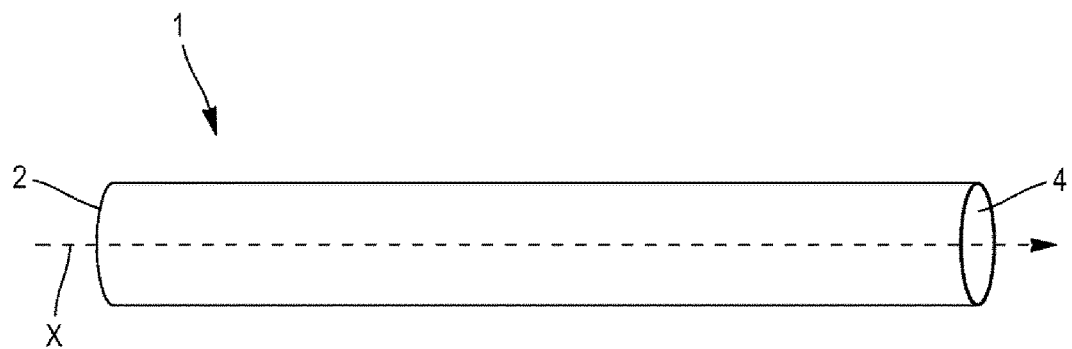
FIGS. 4 to 10 show a protective reinforcement at different stages of its manufacture by means of the method of FIG. 3.

With reference to FIG. 4, the manufacture of a protective reinforcement according to one embodiment of the invention is accomplished starting with a hollow tube 1.

The tube 1 has a cylinder of revolution shape with respect to a longitudinal axis X. The radially inner and outer surfaces of the tube 1 are ruled surfaces of which all the generators are parallel to the longitudinal axis X.

The tube 1 has two opposite longitudinal ends 2 and 4, which will subsequently be designated as base 2 and tip 4 of the tube 1.

The tube is open at its base 2 and at its tip 4.

The tube 1 has for example a diameter of 10 millimeters to 100 millimeters, and a radial thickness of 0.1 millimeter to 0.5 millimeters.

The tube 1 is made of metal.

In a first step 100, the tube 1 is subjected to bending.

The bending 100 is hot bending or cold bending, depending on the material used.

Cold bending has the advantage of being simpler to implement.

When hot bending is implemented, the bending temperature is selected depending on the material of the tube 1.

The bending 100 results in a plastic deformation of the tube 1 between its base 2 and its tip 4, so that the generators of the radially inner and outer surfaces of the hollow tube 1 are no longer rectilinear and parallel to the longitudinal axis X, but rather curved.

The bending 100 is applied so that at least one of the generators becomes a curve of which the trace is substantially congruent with the trace of the leading edge of a blade (not shown in the figures) to which the reinforcement will be applied.

Several bending operations can be implemented so as to form generators with a complex curved shape.

Figure 5:
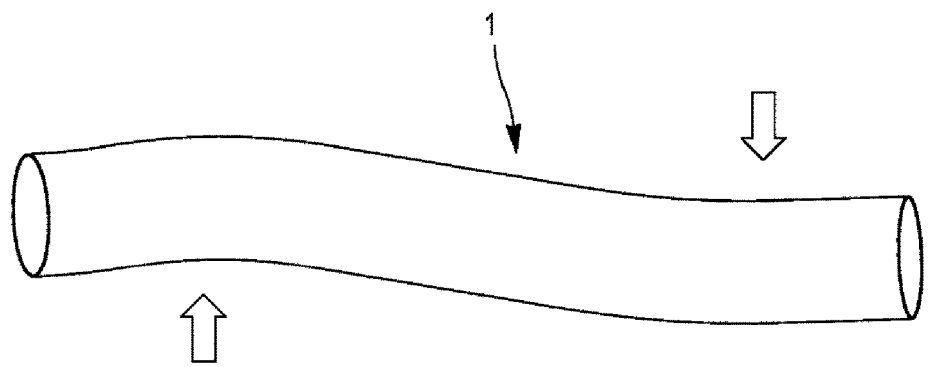

A bent tube 1 is for example obtained as shown in FIG. 5, showing generators whose traces form an S, after bending following the arrows shown in the figure.

In a second step 102, the bent tube 1 is flattened, typically by means of a press.

Figure 6:
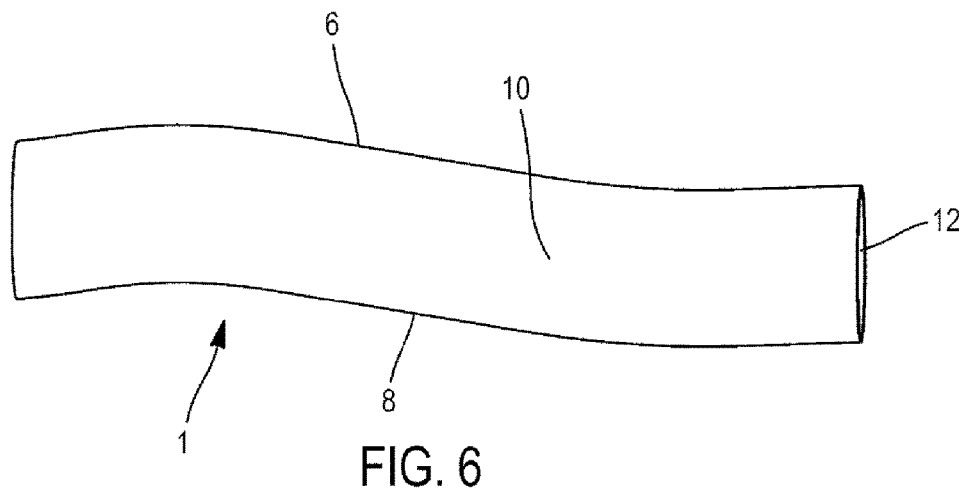

With reference to FIG. 6, the flattened tube 1 thus obtained has two substantially flat portions 16 and 18 facing one another. The two flat portions 16, 18 are mutually connected by two curved fold lines 6 and 8, opposite with respect to the body of the flattened tube 1.

The bent tube is flattened 102 in a direction adapted so that the fold line 6 is substantially complementary to the leading edge of the blade P.

Preferably, the flattening 102 is carried out with a clearance of 2 millimeters.

In a third step 104, an opening 14 is made in the tube 1 over its entire length between the base 2 and its tip 4, by cutting the tube 1 along a cut line opposite to the fold line 6.

The cut line is for example the other fold line 8.

Cutting is for example laser cutting.

Alternatively, the cutting is implemented by wire EDM (electrical discharge machining).

Figure 7:
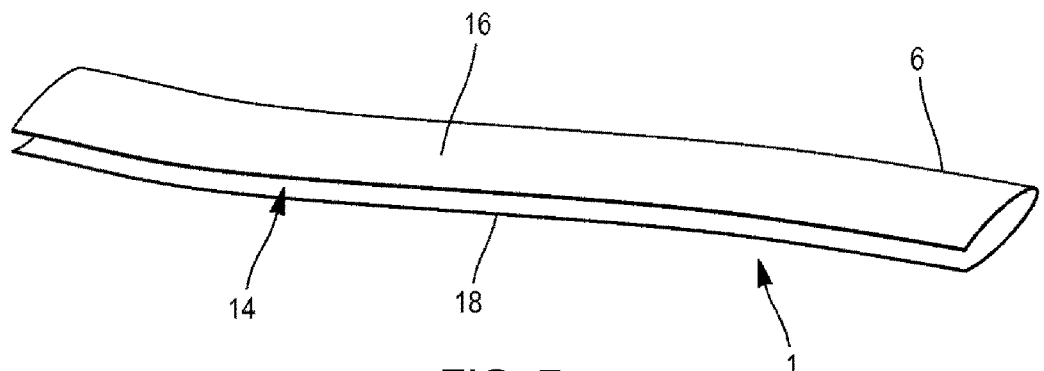

Thus, the open tube 1 has over its entire length a substantially V- or U-shaped cross section as shown in FIG. 7.

The open tube 1 has two flanks connected together by the curved fold line 6 which is left intact, each flank being formed by one of the flat portions 16 and 18 of the flattened tube 1.

One of the flanks 16 is designed to be applied to the pressure side of the blade P, and the other flank 18 is designed to be applied to the suction side of the blade P, the pressure side and the suction side of the blade P being connected to one another by the leading edge BA of the blade P.

If the selected cut line is the curved fold line 8, the two flanks 16, 18 have the same dimensions.

In a fourth step, the open tube 1 is subjected to a stamping operation 106.

Figure 8:
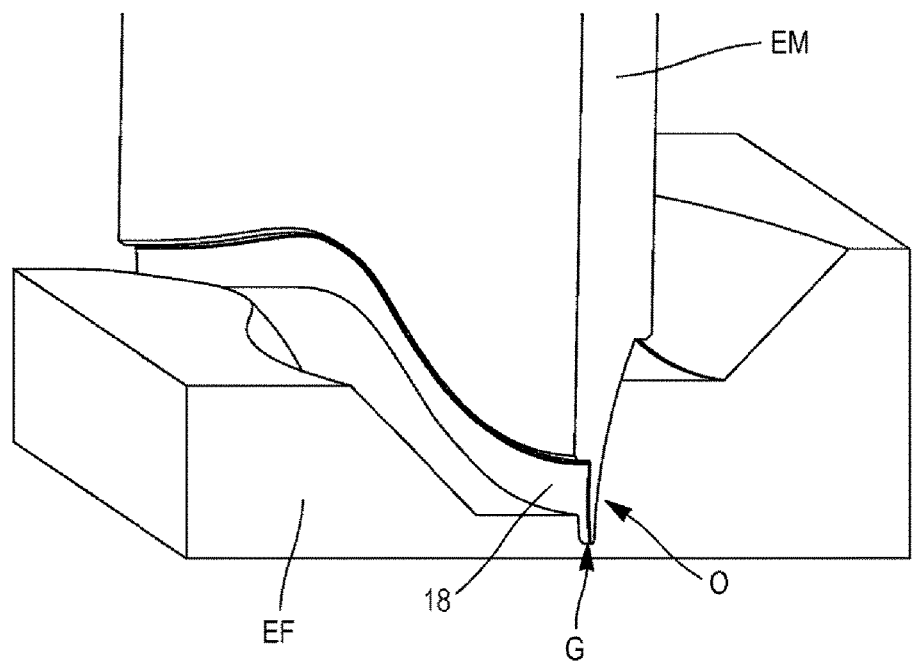

With reference to FIG. 8, the stamping is accomplished by means of a female stamping tool EF, also called a die, and a male stamping tool EM, also called a stamp.

The stamp EM has and end part perfectly reproducing the shape of the blade P on which the reinforcement under manufacture is designed to be applied.

The end portion of the stamp thus comprises a pressure side face reproducing at least partially the pressure side of the blade, a suction side face reproducing at least partially the suction side of the blade, and a curved line of which the trace reproduces the trace of the leading edge BA of the blade P.

The die EF has a groove G with a profile substantially complementary (within the radial thickness of the tube 1) to the profile of the stamp EM.

The groove G has an upper opening opposite to its bottom, and two lateral ends O, (only one of these lateral ends is visible in FIG. 8).

The end of the stamp EM is inserted into the interior of the open tube 1, via the longitudinal opening O made on the entire length of the tube 1 between its base 2 and its tip 4.

The end portion of the stamp is positioned against the inner surface of the open tube 1. More precisely, the inner edge of the fold line 6 of the tube 1, which has been left intact, is placed against the curved lie at the end of the stamp EM.

Stamping 106 is implemented by insertion of the stamp covered by the open tube 1 into the groove G of the die EF.

During this insertion, the flanks of the open tube 1 undergo three-dimensional deformation: they are pressed between the edges of the groove G and the stamp EM.

Once the fold line of the open tube 1 comes into abutment against the bottom of the groove G, the inner surfaces of the flanks 16, 18 of the open tube 1 become complementary to the pressure side and suction side faces of the stamp (and therefore of the blade P which the stamp partially reproduces).

Figure 9:
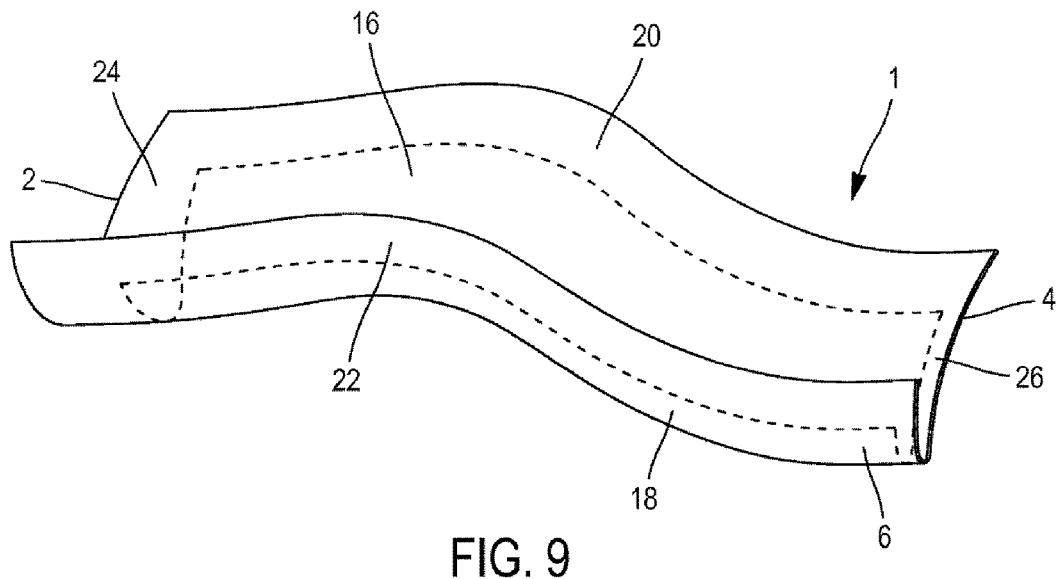

As shown in FIG. 8, the groove G is selected with a smaller depth at the perimeter of the cross-section of the tube 1, so that a free end portion of each flank project out of the groove, when the fold line 6 of the open tube 1 is in abutment against the bottom of the groove G (these free end portions being referenced 20 and 22 in FIG. 9).

Moreover, the groove G extends over a length less than the length of the tube 1 measured between its base 2 and its tip 4, the length of the groove G being equal to the length of the blade P designed to be covered by the reinforcement under manufacture. In this manner, the base 2 and the tip 4 of the stamped tube 1 comprise free end portions 24, 26 projecting out of the groove G by lateral openings O of the groove G, when the fold line 6 is in abutment against the bottom of the groove G.

In a fifth step 108, the stamped tube 1 undergoes trimming.

Trimming 108 is implemented when the tube 1 is stamped into the groove G, the fold line 6 being in abutment against the bottom of the groove G.

Trimming 108 includes cutting at least one of the following portion of the tube 1 projecting out of the groove, considered to be surplus:

the free end portion 20, 22 of each flank opposite to the fold line projecting out from the groove;
the free end portion 24 of the base 2,
a free end portion 26 of the tip 4.

The trimming is implemented for example by laser cutting along the dotted line shown in FIG. 9.

After trimming 108, the flanks 61 and 22 have dimensions suitable for partially covering the pressure side and the suction side of the destination blade.

Figure 10:
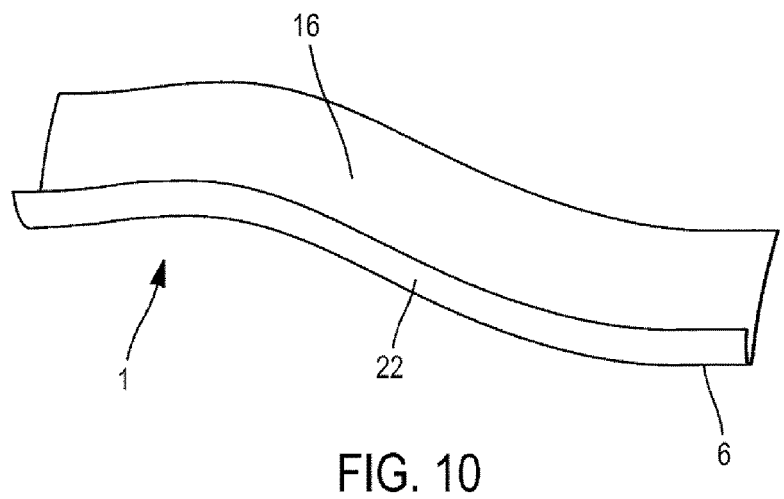

A protective reinforcement for the destination blade is thus obtained, shown in FIG. 10.

During the manufacture of the reinforcement, bending makes it possible to obtain a fold line 6, the profile of which is near that finally expected prior to the stamping step 106, which is considerably simplified because it requires only a single male part EM and a single female part EF to finally comply the protective reinforcement.

The reinforcement is then applied 110 to the destination blade using a conventional attachment technique known to a person skilled in the art. The inner edge of the fold line 6 of the reinforcement has a curvature perfectly complementary to the leading edge BA of the destination blade P. Thus, no undesirable corrugation or fold will appear on the flanks 16, 18 during this assembly step 110.

The method according to the invention can alternatively, or complementarily, be implemented to manufacture a protective reinforcement of the trailing edge of a blade, the trailing edge being opposite to the leading edge with respect to the body of the blade. The protective reinforcement of the trailing edge is then manufactured in the same manner as the protective reinforcement of the leading edge as described above; only the destination edge of said reinforcement changes during the application of the assembly step 110.

The invention claimed is:

1. A method for manufacturing a protective reinforcement of a leading (BA) or trailing edge of a blade (P), wherein the leading (BA) or trailing edge is curved, wherein the method comprises:

flattening (102) a hollow tube (1) so as to form at least one fold line (6) extending along the tube (1),
opening (104) the flattened tube (1) by cutting the flattened tube (1) along a cut line (8) opposite to the fold line (6) with respect to the flattened tube (1), so as to form two flanks (16, 18) connected to the fold line (6) and designed to be applied to the pressure side and the suction side of the blade (P), wherein the method further comprises:

before flattening the hollow tube, bending (100) the hollow tube (1) so that the fold line (6) after flattening (102) is curved and substantially complementary to the curved leading (BA) or trailing edge of the blade (P).

2. The method according to claim 1, wherein the bending (100) is cold bending.

3. The method according to claim 1, wherein the flattening (102) of the hollow tube (1) forms on the tube (1) two opposite fold lines (6, 8), and wherein the cut line (8) is one of the two fold lines.

4. The method according to claim 1, wherein the tube (1) is made of metal.

5. The method according to claim 1, further comprising stamping (106) the open tube (1) so as to comply the flanks (16, 18) in a manner complementary to the pressure side and the suction side of the blade (P).

6. The method according to claim 5, wherein the open tube (1) is stamped by means of a stamp (EM) into a groove (G) formed in a die (EF), wherein the groove (G) has a depth adapted so that at least one of the flanks of the tube (16, 18) has a free end portion (20, 22) projecting out of the groove (G) when the fold line is in abutment against the bottom of the groove (G), wherein the method further comprises cutting the free end portion (20, 22).

7. The method according to claim 6, wherein the cutting is a laser cutting.

8. The method according to claim 6, wherein the cutting comprises wire EDM.

9. The method according to claim 5, wherein the open tube (1) is stamped by means of a stamp into a groove formed in a die, wherein the groove has two opposite lateral openings and a length measured between the two lateral openings less than the length of the fold line of the open tube (1), wherein the open tube (1) is positioned in the groove (G) so that two free longitudinal end portions (24, 26) thereof project out of the two lateral openings (0) of the groove (G), wherein the method further comprises cutting at least one of said free longitudinal end portions (24, 26).

10. The method according to claim 9, wherein the cutting is a laser cutting.

11. The method according to claim 9, wherein the cutting comprises wire EDM.

12. A method for manufacturing a reinforced blade comprising:

manufacturing a protective reinforcement by means of a method according to claim 1,
attaching the protective reinforcement to a blade (P) comprising a curved leading (BA) or trailing edge, wherein the fold line (6) of the reinforcement is applied against the leading (BA) or trailing edge of the blade (P) and wherein the flanks (16, 18) are applied to the pressure side and the suction side of the blade (P).

* * * * *